US012097540B2

(12) United States Patent
Rickey et al.

(10) Patent No.: US 12,097,540 B2
(45) Date of Patent: Sep. 24, 2024

(54) MODULAR POWER WASHER SYSTEM, METHOD AND KIT THEREFOR

(71) Applicant: TTI (MACAO COMMERCIAL OFFSHORE) LIMITED, Macau (CN)

(72) Inventors: Todd Rickey, Kwai Chung (CN); Sven Eschrich, Dongguan (CN)

(73) Assignee: TTI (MACAO COMMERCIAL OFFSHORE) LIMITED, Macao (CN)

( * ) Notice: Subject to any disclaimer, the term of this patent is extended or adjusted under 35 U.S.C. 154(b) by 937 days.

(21) Appl. No.: 16/065,980

(22) PCT Filed: Feb. 22, 2016

(86) PCT No.: PCT/CN2016/074288
§ 371 (c)(1),
(2) Date: Jun. 25, 2018

(87) PCT Pub. No.: WO2017/143497
PCT Pub. Date: Aug. 31, 2017

(65) Prior Publication Data

US 2019/0009309 A1 Jan. 10, 2019

(51) Int. Cl.
*B08B 3/02* (2006.01)
*B05B 9/00* (2006.01)

(52) U.S. Cl.
CPC .............. *B08B 3/028* (2013.01); *B05B 9/007* (2013.01); *B08B 3/026* (2013.01);
(Continued)

(58) Field of Classification Search
CPC . B08B 3/028; B08B 3/026; B08B 2203/0276; B08B 2203/027; B08B 2203/0223; B05B 9/007
See application file for complete search history.

(56) References Cited

U.S. PATENT DOCUMENTS 5,100,058 A 3/1992 Wei
5,299,767 A * 4/1994 Simpson ................ B05B 15/00 239/175

(Continued)

FOREIGN PATENT DOCUMENTS

CN 2880608 Y 3/2007
CN 102301246 A 12/2011

(Continued)

OTHER PUBLICATIONS

TTI (Macao Commercial Offshore) Limited; International Patent Application No. PCT/CN2016/074288; International Search Report; Nov. 15, 2016; (3 pages).

(Continued)

*Primary Examiner* — Alexander Markoff
(74) *Attorney, Agent, or Firm* — Dority & Manning, P.A.

(57) ABSTRACT

A modular power washer contains a power washing system (10), containing a base unit (20) and an accessory unit (34), wherein the accessory unit (34) is removably-attached to the base unit (20). The base unit (20), contains a housing (22), a pump (26), a motor (24), a power source (28), an input valve (64), and an output valve (32). The housing (22), contains the pump (26), and the motor (24), therein, and the housing (22), at least partially contains the power source (28), therein. The motor (24), is operatively-connected to the power source (28). The pump (26), is operatively-connected to the motor (24). The pump (26), is fluidly-connected to the input valve (64), and the output valve (32). The accessory unit (34), is selected from a hose storage unit (68), an additive tank (88), a handle (36) a roll bar (50), a frame (72), a wheel (74), and a combination thereof. A kit and a method of use are also described herein.

14 Claims, 6 Drawing Sheets

(52) U.S. Cl.
CPC . *B08B 2203/0223* (2013.01); *B08B 2203/027* (2013.01); *B08B 2203/0276* (2013.01)

(56) References Cited

U.S. PATENT DOCUMENTS

| | | | | | |
|---|---|---|---|---|---|
| 5,538,402 | A * | 7/1996 | McKenney | B05B 9/007 | 417/234 |
| 6,164,298 | A * | 12/2000 | Petter | B08B 3/026 | 134/104.4 |
| 6,625,844 | B2 * | 9/2003 | Savage | A47L 11/34 | 15/320 |
| 2002/0033185 | A1 * | 3/2002 | Hoenisch | B08B 3/026 | 134/22.12 |
| 2006/0144961 | A1 * | 7/2006 | DeKeyser | A01C 5/02 | 239/398 |
| 2007/0120366 | A1 * | 5/2007 | Grant | F02N 11/04 | 290/1 A |
| 2008/0231144 | A1 * | 9/2008 | Grant | F02N 11/14 | 310/339 |
| 2008/0265844 | A1 * | 10/2008 | Smith | F02B 63/04 | 322/1 |
| 2009/0284022 | A1 * | 11/2009 | Usselman | F02D 29/06 | 290/38 R |
| 2009/0295169 | A1 * | 12/2009 | Usselman | F02N 11/06 | 290/1 A |
| 2010/0192980 | A1 * | 8/2010 | Turner | A47L 11/4036 | 134/21 |
| 2010/0282866 | A1 | 11/2010 | Gilpatrick et al. | | |
| 2014/0119949 | A1 * | 5/2014 | Wischstadt | F04B 17/05 | 417/34 |
| 2014/0246517 | A1 * | 9/2014 | Raasch | F04F 5/12 | 239/398 |
| 2015/0316913 | A1 | 11/2015 | Rickey et al. | | |
| 2016/0377219 | A1 * | 12/2016 | Malfavon | F16H 7/02 | 474/150 |

FOREIGN PATENT DOCUMENTS

| | | | |
|---|---|---|---|
| CN | 102489463 | A | 6/2012 |
| CN | 204234393 | U | 4/2015 |
| DE | 29717495 | U1 | 10/1998 |
| EP | 3159541 | A1 | 4/2017 |
| WO | WO2010/088244 | A1 | 8/2010 |
| WO | WO2015/194426 | A1 | 12/2015 |

OTHER PUBLICATIONS

TTI (Macao Commercial Offshore) Limited; EP Patent Application No. EP16919576; Supplementary European Search Report; Jul. 27, 2020; (1 page).

* cited by examiner

MODULAR POWER WASHER SYSTEM, METHOD AND KIT THEREFOR

This application is a National Stage Patent Application of PCT/CN2016/074288, filed on Feb. 22, 2016, the disclosure of which is incorporated by reference herein in its entirety.

FIELD OF THE INVENTION

The present invention relates to the field of powered outdoor equipment, and more specifically to power washers. Methods of using such a power washer and a kit therefor are also describe herein.

BACKGROUND

Power washers are known in the art and can be powered by DC batteries, AC power or internal combustion engines. Power washers are typically used to provide a high pressure water stream to clean surfaces such as walls, sidewalks, cars, etc. The water from a reservoir or a hose is passed through a pump which creates a high pressure stream which flows through a hose to a wand for spraying. The stream exits and is directed with the wand. Typically the wand has a handle which allows the user to easily and securely hold the wand, because as the water exits the wand with great velocity, it exerts a strong force pushing back on the wand.

Power washers are increasingly popular to clean materials such as concrete, wood, plastics, and metals. Typically power washers are sold with various attachments such as different wands for different spray patterns, hose extensions, etc. However, it has been found that users desire even greater customizability and personalized options. Furthermore, customizable features may be desirable from the side of the manufacturer so as to provide different price points and options to the user. In other cases, the user may wish to add or remove certain features depending on the use of the power washer at that specific time. Other times, such as during storage, it is desirable to break down the power washer to allow it to fit into a more compact space or area.

Accordingly, the need remains for a power washer which provides greater customizability, flexibility, features, and/or options and which are also removable for storage, when they are not needed, and/or when other features are desired by the user.

SUMMARY OF THE INVENTION

A modular power washer contains a base unit and an accessory unit wherein the accessory unit is removably-attached to the base unit. The base unit contains a housing, a pump, a motor, a power source, an input valve and an output valve. The housing contains the pump and the motor therein, and the housing at least partially contains the power source therein. The motor is operatively-connected to the power source. The pump is operatively-connected to the motor. The pump is fluidly-connected to the input valve and the output valve. The accessory unit is selected from a hose storage unit, an additive tank, a handle, a roll bar, a frame, a wheel, and a combination thereof.

A power washer kit contains a base unit and an accessory unit wherein the accessory unit is initially separate from the base unit and wherein the accessory unit is removably-attached to the base unit. The base unit contains a housing, a pump, a motor, a power source, an input valve and an output valve. The housing contains the pump and the motor therein, and the housing at least partially contains the power source therein. The motor is operatively-connected to the power source. The pump is operatively-connected to the motor. The pump is fluidly-connected to the input valve and the output valve. The accessory unit is selected from a hose storage unit, an additive tank, a handle, a roll bar, a frame, a wheel, and a combination thereof.

A method for using a power washer contains the steps of selecting an attachment unit, removably-affixing the attachment unit to the base unit, and removing the attachment unit from the base unit.

Without intending to be limited by theory, it is believed that the above inventions alleviate some of the problems associated with previous power washers and their use. It is believed that the modular nature of the base unit and the removably-attachable accessory units allow the user to customize the power washer to the specific needs of the user and/or even the needs of that particular time it is being used. Such various configurations may also allow the same base unit to be expandable to contain additional features as the user's needs increase over time. Thus the system is flexible in that the user may be able to purchase/add/remove functionality without having to replace the base unit. Also, the removability of the accessory units allows the power washing system to be easily stored in a smaller, more compact space than otherwise possible.

The figures herein are for illustrative purposes only and are not necessarily drawn to scale.

DESCRIPTION OF THE PREFERRED EMBODIMENTS

Unless otherwise specifically provided, all tests herein are conducted at standard conditions which include a room and testing temperature of 25° C., sea level (1 atm.) pressure, pH 7, and all measurements are made in metric units. Furthermore, all percentages, ratios, etc. herein are by weight, unless specifically indicated otherwise.

A modular pressure washing system has a base unit having a housing, a pump, a motor, a power source, an input valve, an output valve, and an accessory unit. The housing contains the pump and the motor and at least partially contains the power source. The motor is operatively-connected to the power source and the motor. In cases where the power source is an internal combustion engine, then the motor and the power source may actually be connected or even be the same.

The pump is fluidly-connected to the input valve and is also fluidly-connected to the output valve. The input valve is typically connected to a hose which then leads to the water supply such as a water tank, a water faucet, etc. The output valve is typically connected to a different hose which leads to a wand (see FIG. 1 at 42, 44), typically the wand grip (see FIG. 1 at 44). Typically, the input valve and the output valve are connected to opposite functional ends of the pump. The accessory unit is selected from the group of a hose storage unit, an additive tank, a handle, a roll bar, a frame, a wheel, and a combination thereof.

Figure 1:
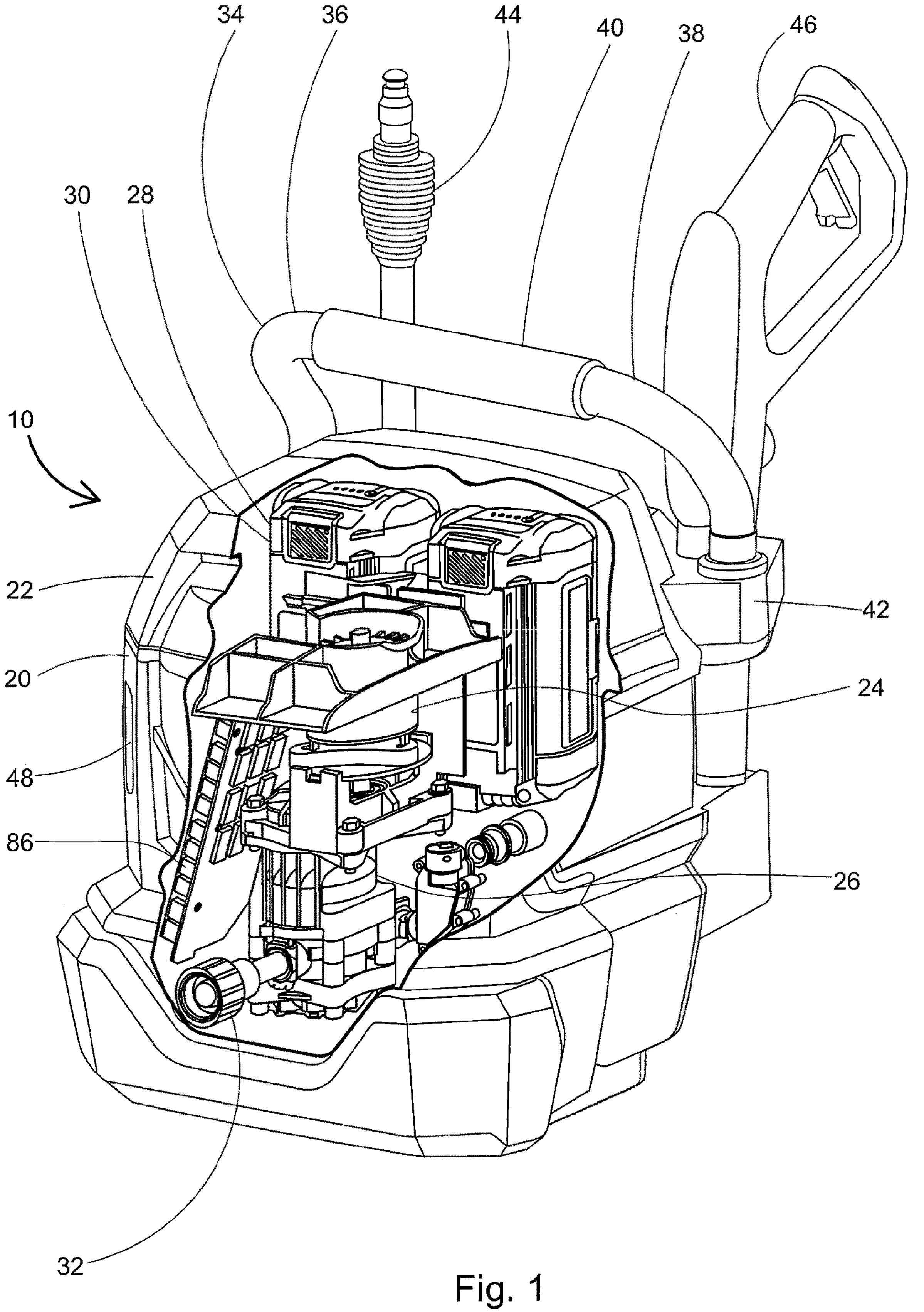
FIG. 1 shows a cut-away front perspective view of an embodiment of the power washer of the present invention.

Turning to the figures, FIG. 1, shows a partially-cut-away, side-perspective view of a power washing system, 10, having a base unit, 20. The base unit, 20, contains a housing, 22, containing a motor, 24, and a pump, 26. The motor, 24, is operatively-connected to the pump, 26, so as to be able to drive the pump, 26.

The housing will typically be made of a relatively tough material selected from a plastic, a resin, rubber, metal, and a combination thereof; or a plastic, rubber, a metal and a combination thereof. The plastic herein may be a high impact plastic; or polyethylene, polypropylene, polystyrene, and a combination thereof; or linear low density polyethylene, low density polyethylene, high density polyethylene, and a combination thereof either with or without other co-monomers. The metal useful herein may be, for example, brass, steel (including stainless steel), iron, aluminium, other metals known in the art of power washers and power tools, and a combination thereof.

The pump useful herein is typically a high pressure pump; or a high pressure electric pump, having an output of more than about 500 psi (3.4 MPa); or of from about 500 psi (3.4 MPa) to about 5000 psi (34 MPa); or from about 1000 psi (6.8 MPa) to about 4000 psi (27.6 MPa); or from about 1250 psi (8.6 MPa) to about 3500 psi (24.1 MPa). Such pumps are commonly available from many makers worldwide.

In FIG. 1, the housing, 22 also contains a power source, 28, which in this case is a plurality of electric batteries, 30. The battery useful herein is typically a rechargeable electric battery having a voltage of more than 1 v; or from about 1 v to about 56 v; or from about 1.5 v to about 48 v; or from about 3 v to about 45 v; or from about 6 v to about 40 v. The power washer herein includes at least one battery; or from about 1 to about 12 electric batteries; or from about 2 to about 8 electric batteries. In FIG. 1, it can be seen that the power washer, 10, contains 2 electric batteries, 16 and 16', each rated at about 18 v. The battery useful herein typically possesses a mAh rating of greater than 750 mAh; or from about 750 mAh to about 10000 mAh; or from about 1000 mAh to about 6000 mAh; or from about 1100 mAh to about 5000 mAh. The chemistry in the battery is largely irrelevant, but may be, for example nickel-cadmium, lithium ion, or a combination thereof; or lithium ion.

The power source, 28, is operatively-connected to the motor, 24. The pump, 26, is fluidly-connected to both the input valve (See FIG. 3 at 64) and the output valve, 32. The pump, 26, draws water from the input valve (see FIG. 3 at 64) and creates a high pressure water stream which exits via the output valve, 32.

In FIG. 1, an accessory unit, 34, which in this case is a handle, 36, specifically a non-telescoping handle, 38, is removably-affixed to the housing, 22, via two securing members, 42, which are firmly-attached to the housing, 22. The accessory unit herein is considered to be a feature or component of the power washing system which is not required for an operational power washer. The accessory unit is therefore optional to the power washer, but is necessary for the claimed power washing system.

The handle, 36, is covered with an optional rubber grip, 40, which provides a firm place to hold the base unit, 20, when picking up and moving it, and also increases friction so as to reduce slippage. Without intending to be limited by theory, it is believed that a rubber grip is especially useful herein, as the handle will often become wet and slippery during use. Furthermore, the power washing system may weigh more than 10 or even more than 15 kg. Accordingly, having a rubber (or other type of) grip which is remains securely graspable even when wet is especially desired by users. The handle useful herein is typically selected from a telescoping handle (FIG. 5 at 76) and a non-telescoping handle, 38. In an embodiment herein, the securing members may form an integral part of the housing. In an alternate embodiment herein, the securing members may be attached to the housing with, for example, removable screws or other fasteners. However, such securing members should be designed such that they remain attached to the housing unless they are specifically removed by the user. In an embodiment herein the base unit and/or the housing contains from about 1 to about 12 securing members; or from about 2 to about 8 securing members; or from about 2 to about 6 securing members.

In an alternate embodiment herein, a handle, 36, may be incorporated directly into the housing, 22. In such a case, the handle may be moulded into the housing, may be a concave indentation in the housing, and/or may be separate from the housing.

The base unit, 20, also contains a wand, 44, and a wand grip, 46, removably-attached thereto. However, such a wand and a wand grip are not considered to be accessory units herein, as these are not optional, but instead are considered to be required for typical use of the pressure washer. Similarly, a hose is required and is therefore not considered to be an accessory unit within the meaning of this term as used herein, whereas an optional hose storage unit is considered to be an accessory unit. The wand, 44 and the wand grip, 46, may also be removably-attached to the housing via securing members, 42, or other structures as desired.

In FIG. 1, additional securing members, 42, may be connected at attachment sites, 48, in the front of the housing. Such a provision of attachment sites allows for future customization of the power washing system. The housing herein will typically contain from about 1 to about 10 attachment sites; or from about 2 to about 8 attachment sites; or from about 2 to about 6 attachment sites.

Figure 2:
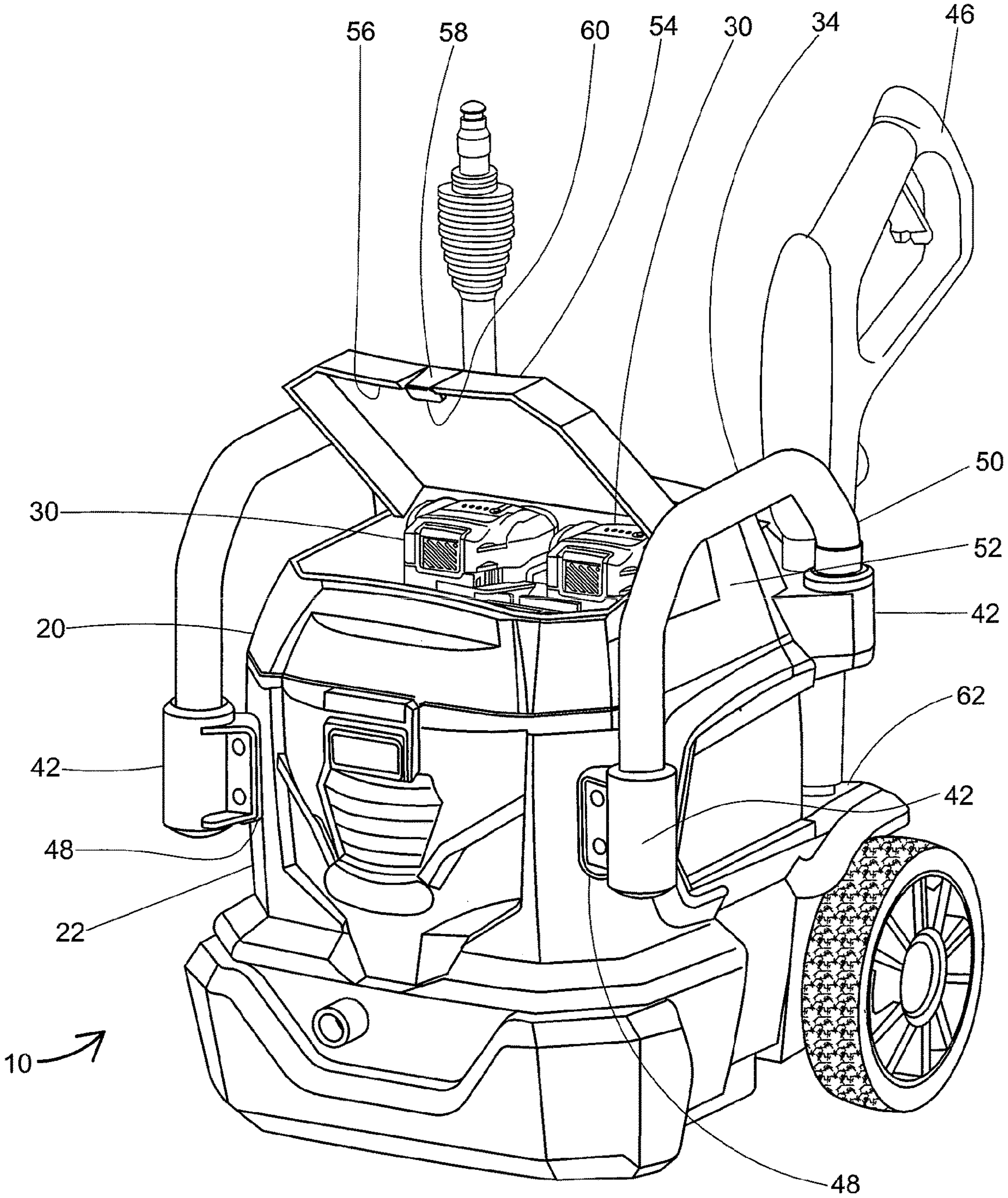
FIG. 2 shows a front perspective view of an embodiment of the power washer of the present invention.

FIG. 2, shows a side-perspective view of an embodiment of the power washing system of the present invention. In FIG. 2, the base unit, 20, contains a securing member, 42, in an attachment site, 48, which allows an accessory unit, 34, to be attached thereto. In the embodiment of FIG. 2, the accessory unit, 34, is a roll bar, 50, which runs from the front of the housing, 22, to the back of the housing, 22, and protects the base unit, 20, from damage if it falls over during use and/or transport. Accordingly, such roll bars typically project from the housing in at least one, if not all directions so as to protect the housing. In an embodiment herein, the roll bar also has a rubber grip (see FIG. 1 at 40).

FIG. 2 also shows that the housing, 22, contains a top portion, 52, which contains a door, 54, which opens to allow access to the battery, 30. The door, 54, contains a battery seal, 56, which reduces the chance that water will reach the battery when the door, 54, is closed. In an embodiment herein the battery seal is a water-tight seal that prevents water from accessing the battery when the door is closed. The battery seal may be formed of/by, for example, a gasket, a knife-edge combing, a sealing fin, an O-ring, and a combination thereof; or a gasket, a knife-edge combing, and a combination thereof. In an embodiment herein, the gasket may be formed from rubber, foam, a plastic, and a combination thereof. In an embodiment herein, the battery seal is located on a location such as the door, the housing, and a combination thereof. The door, 54, may further contain a locking mechanism, 58, which in FIG. 2 is a simple latch, 60, although other locking mechanisms are also useful herein. Without intending to be limited by theory, it is believed that the locking mechanism is especially useful t prevent the door from coming open during use and thereby allowing water to reach the batteries, which could potentially cause damage to the batteries and/or the power washing system. In this embodiment, the batteries, 30, are optionally removable, for ease of recharging and/or replacement.

In FIG. 2, it can also be seen that there is an optional holder, 62, for the wand grip, 46, in the rear of the housing, 22. In an embodiment herein, the housing contains a holder for the wand and the wand grip. In an embodiment herein, the holder is removably-attached to the housing. In an embodiment herein, the holder is an accessory unit.

Figure 3:
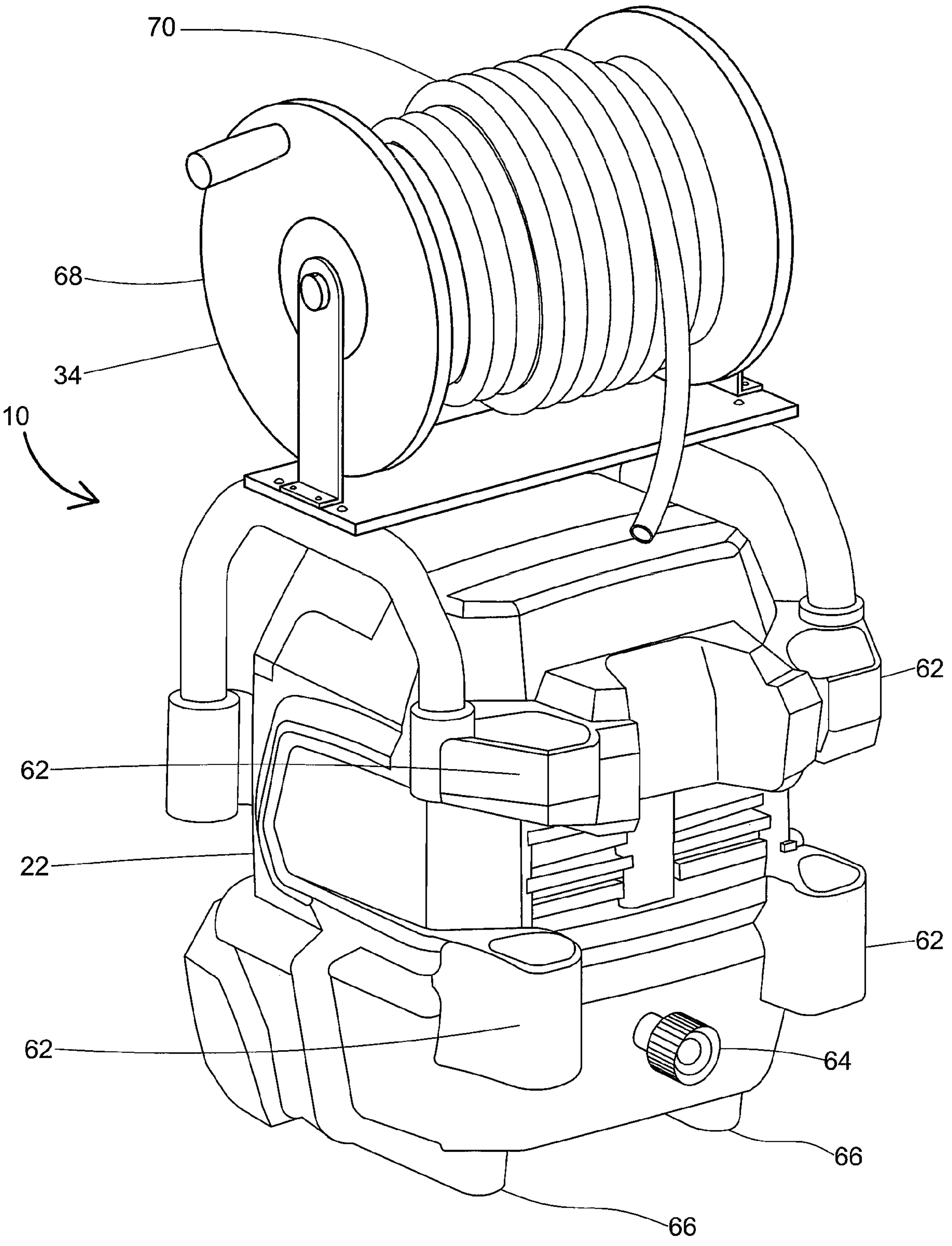
FIG. 3 shows a back perspective view of an embodiment of the present invention.

FIG. 3 shows a back perspective view of an embodiment of the power washer herein. In FIG. 3, a plurality of holders, 62, can be seen attached to the housing, 22. The wand (FIG. 1 at 44), the wand grip (FIG. 1 at 46), etc. may be placed in the holders, 62, as needed. In an embodiment herein the holder is integrally-formed with a securing member.

FIG. 3 also shows an input valve, 64, which is optionally at the bottom of the housing, 22. In an embodiment herein the input valve is at the rear of the housing. In another embodiment herein the input valve is at the front of the housing. The input valve, 64, connects with the water source, such as a water reservoir or a water faucet, and draws water into the housing, 22, of the power washing system, 10. This view also shows the rear feet, 66, which are present to keep the power washer level and to prevent it from falling/tipping over. The rear feet, 66, may be permanently affixed to the housing, 22, (e.g., by co-moulding), and/or may be removably-affixed as desired.

On the top of the roll bars, 50, in FIG. 3 is attached an accessory unit, 34, which in this case is a hose storage unit, 68, upon which is wound a hose, 70, for storage, and/or transport. Thus, in an embodiment herein the accessory unit contains a pair of roll bars as well as a hose storage unit. It is understood that the hose storage unit may be attached to the roll bars, or may otherwise be attached, either directly or indirectly, to the housing as desired. The hose, 70, may be connected to either the input valve, 64, or the output valve (FIG. 1 at 32), as desired. In an embodiment herein, the hose is connected to the output valve. In an embodiment herein, the hose is a high pressure hose capable of withstanding a pressure of greater than about 50 psi (0.34 MPa); or of from about 50 psi (0.34 MPa) to about 5000 psi (34 MPa); or from about 100 psi (0.68 MPa) to about 4000 psi (27.6 MPa); or from about 125 psi (0.86 MPa) to about 3500 psi (24.1 MPa).

Figure 4:
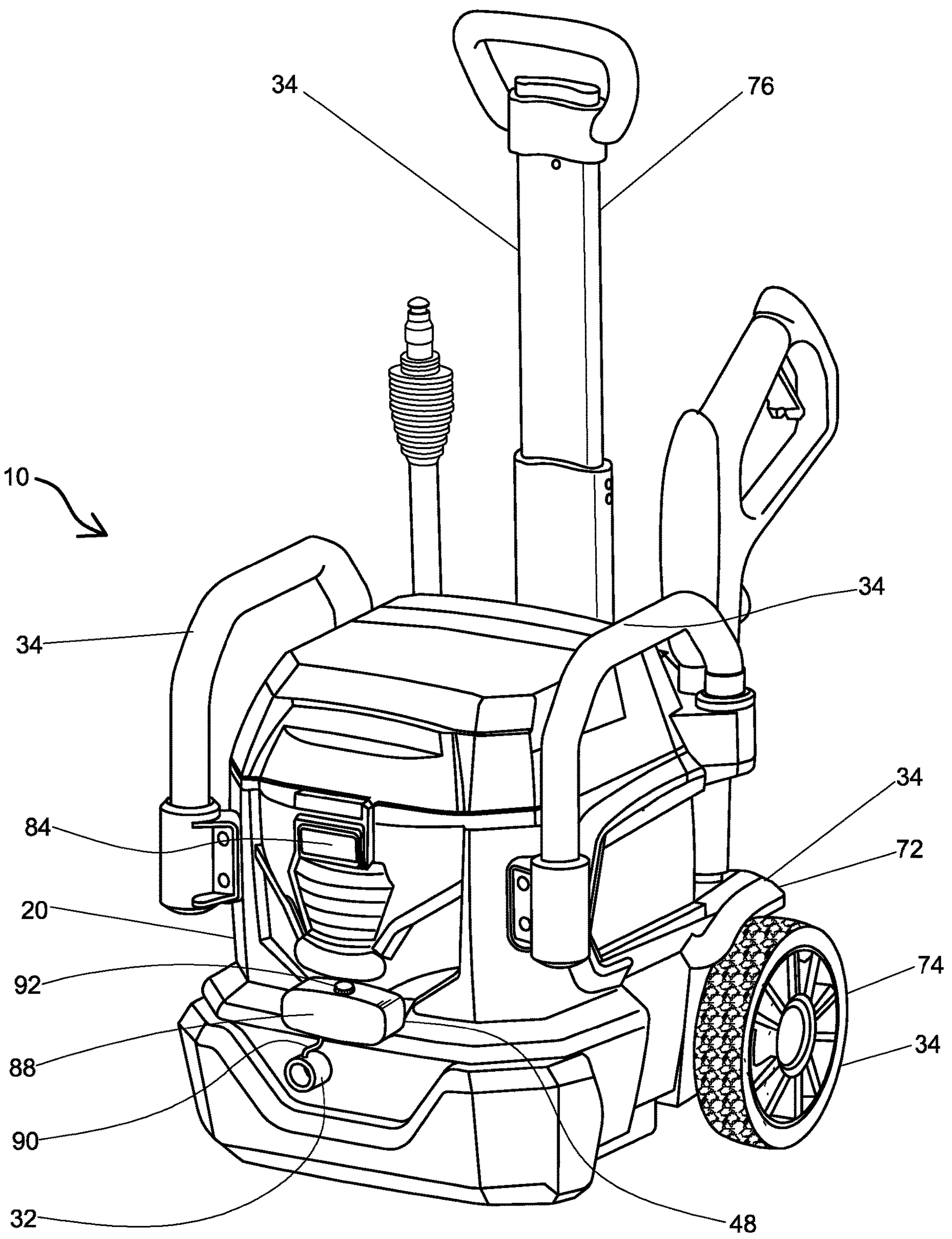
FIG. 4 shows a front perspective view of an embodiment of the present invention.

FIG. 4 shows a front-perspective view of an embodiment of the power washing system, 10, of the present invention. The base unit, 20, has an accessory unit, 34, consisting of a pair of roll bars, 50, attached thereto, as well as an accessory unit, 34, consisting of a frame, 72. In an embodiment herein, the frame is securely, yet removably-affixed to the housing via methods known in the art, such as screws, releasable snap-fit closures, bolts, fasteners, corresponding male-female closures, etc. In addition, the power washing system, 10, also contains an accessory unit, 34, consisting of two wheels, 74, of which only one wheel is visible in FIG. 4. Without intending to be limited by theory, it is believed that the wheels allow the power washing system to be easily transported. In an embodiment herein the power washing system has from about 1 to about 6 wheels; or from about 2 to about 4 wheels; or about 2 wheels.

Also attached to the frame, 72, is an accessory unit, 34, consisting of a handle, 36, which in FIG. 4 is a telescoping handle, 76. In this embodiment, the user can extend and shrink the telescoping handle as desired for storage, transportation, etc. Without intending to be limited by theory, it is believed that the user may wish to shorten the telescoping handle during use, so that it is out of the way; however, during transport, the user may wish to extend the telescoping handle so as to allow greater leverage and more easily move the power washing system. Telescoping mechanisms useful in the telescoping handle are commonly utilized in, for example, the luggage art. In an embodiment herein, the telescoping handle is attached directly to the housing; the top of the housing, or the back of the housing. In another embodiment herein, the telescoping handle is attached to the frame; or the back of the frame.

In an embodiment herein, the accessory unit contains a pair of roll bars, a frame, two wheels, and a telescoping handle. The roll bars and the frame are attached to the housing, while the two wheels and the telescoping handle are attached to the frame; or the rear of the frame. Without intending to be limited by theory, it is believed that such an arrangement is particularly suited for a power washing system, as the leverage provided by the length of the telescoping handle and the positioning of the wheels allows easy transportation of a relatively heavy power washing system, by a user with a minimal amount of effort and requires little strength, especially as compared to a power washing system without wheels and/or without a telescoping handle. Furthermore, it is believed that such features are especially useful if they may be removably-attached to the housing, either directly or indirectly, allowing the user significant flexibility to customize the power washing system for their individual needs.

Also in FIG. 4, an additive tank, 88 (a type of accessory unit), is shown connected to the front of the housing, 22, above the output valve, 32. The additive tank, 88, is provided to contain an additive, typically a concentrated additive, which may be added to the pressurized water flowing through the output valve, 32. The additive herein may be provided for specific or general cleaning uses. Examples of the additive useful herein include, for example, a soap, a surfactant, a degreaser, an acid, a base, a particulate, and a combination thereof. In FIG. 4, the additive tank, 88, is placed on the front of the housing, 32, via an attachment site, 48, but may be located in a variety of locations and is not limited to the front of the housing. The additive flows from the additive tank, 88, to the output valve, 32, via an additive tube, 90. In such a case, a special output valve may be provided which is connectable to the additive tube. Alternatively, the additive tube may be fluidly-connected to the hose, wand, fluid path and/or other locations as known in the art. The additive is refilled into the additive tank, 88, by removing an additive cap, 92, which in this case is a screw-top cap.

Figure 5:
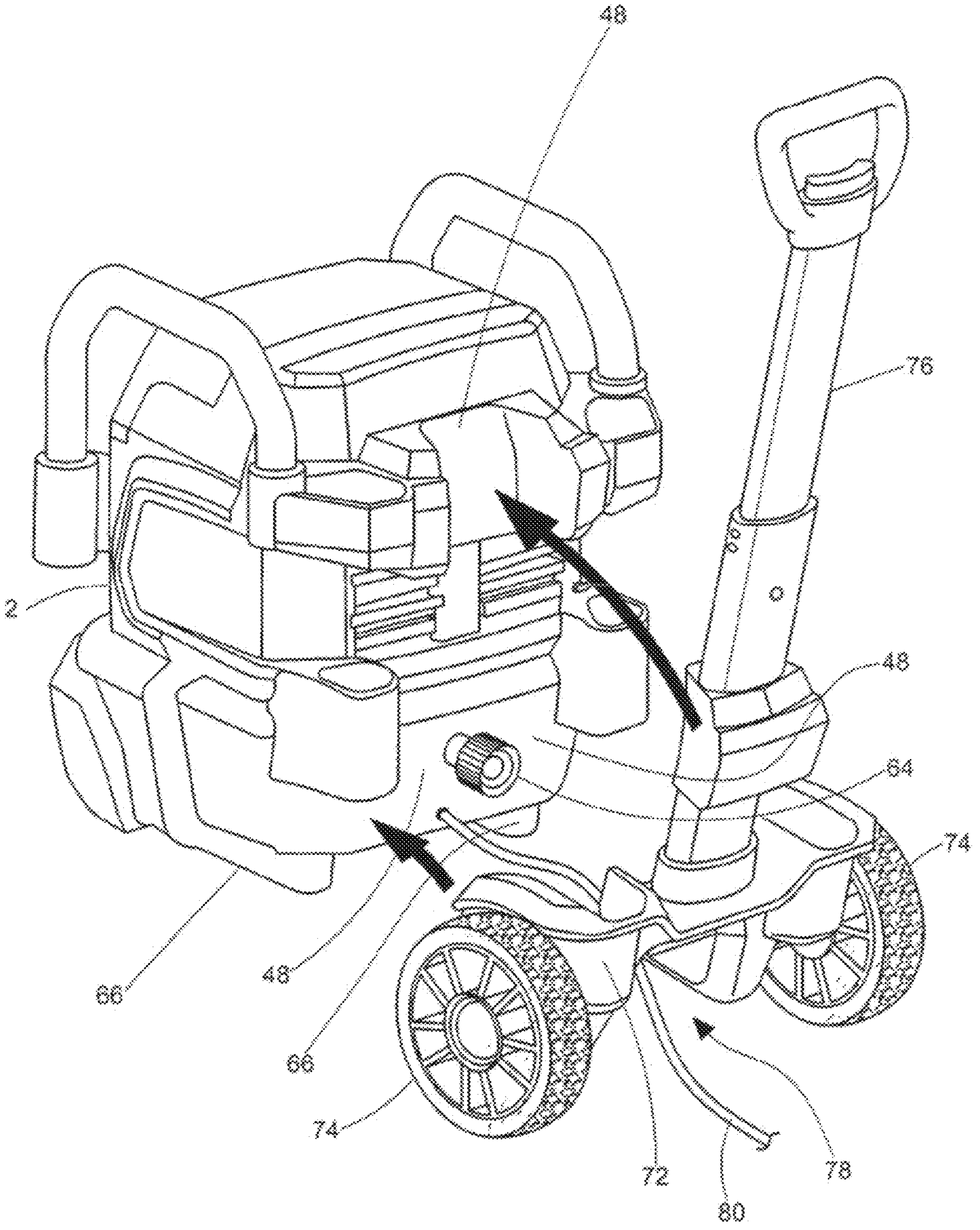
FIG. 5 shows a back perspective view of an embodiment of the present invention indicating the attachment of a frame with wheels.

FIG. 5 shows a rear-perspective view of an embodiment of the power washing system, 10, of the present invention. FIG. 5 shows how the housing, 22, fits together with the frame, 72, when it is removably-attached thereto. The frame, 72, securely connects to the housing, 22, via the three attachment sites, 48. The telescoping handle, 76, and the two wheels, 74, both attach to the frame. In addition, the frame, contains a cut-out area, 78, which leaves room for the hose (see FIG. 4 at 70) to be attached to the input valve, 64. Without intending to be limited by theory, it is believed that such a cut-out area is essential to maintain the functionality of the power washing system if the frame would otherwise block the input (or output) valve. As will be seen in FIG. 6, part of the frame, 72, also slides under the rear feet, 66, so as to support the housing. FIG. 5, also shows an AC power cord, 80, exiting the housing, 22, to connect to an AC power source such as an AC electrical grid, via, for example, a standard AC plug. In an embodiment herein, the cut-out area also provides space for an AC power cord to pass through.

Figure 6:
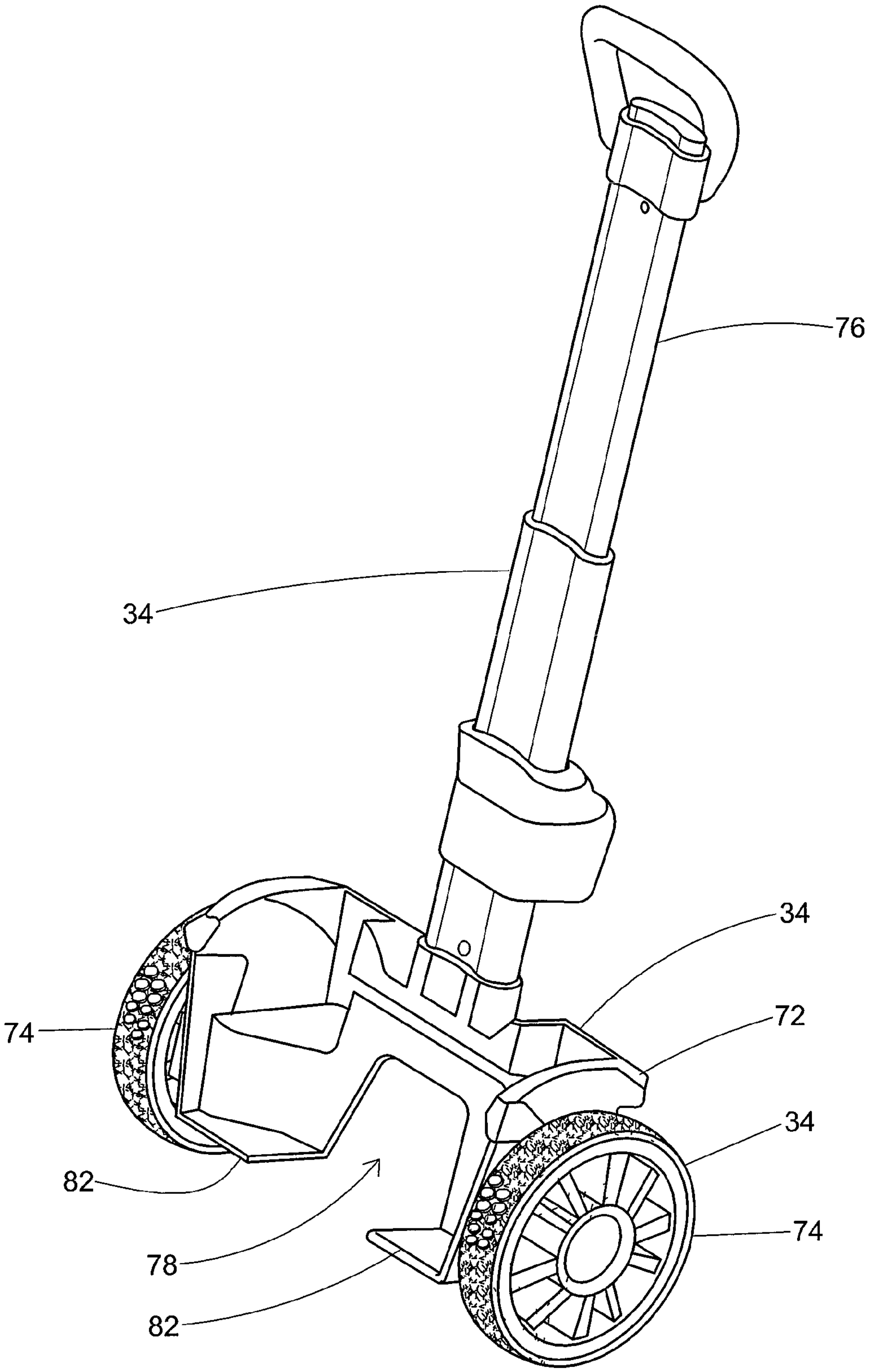
FIG. 6 shows a front perspective view of an embodiment of a frame with wheels useful herein.

FIG. 6 shows a perspective view of a frame, 72, useful herein, to which the wheels, 74, and the telescoping handle, 76, are attached. This view also shows that the frame, 72, clearly has a cut-out area, 78, which provides space for the input valve (see FIG. 5 at 64) and hose (see FIG. 4 at 70) to fit without being blocked by the frame, 72. In addition, FIG. 6 shows two support plates, 82, attached to the frame, 72, which slide under the rear feet (see FIG. 5 at 66) on the housing (FIG. 5 at 22) to help support the housing (FIG. 5 at 22) when it is attached to the frame, 72. Accordingly, in an embodiment herein, the frame contains a support plate; or about two support plates; or a plurality of support plates.

In an embodiment herein, the power washing system, 10, further contains a display screen, 84, as seen in FIG. 4. The display screen, 84, may provide information about the status and running conditions of the power washing system, 10, such as the remaining battery life, for example, as a percentage or a graphic, the spray power, the remaining spray time in, for example, minutes and/or seconds, the temperature of the water, the temperature or condition of the battery, the power being drawn, etc. The display screen may be, for example, a LED screen, or other screen. In an embodiment herein the display screen is located on the housing. In an embodiment herein the display screen, 84, is located on the wand, 48, and communicates with a printed circuit board (see FIG. 1 at 86) in the housing, 22, either via wires (not shown) or wirelessly. The printed circuit board, 86, may further act as an electronic control center for the power washing system, 10, and regulate one or more parameters such as, but not limited to, power output, battery drain, water pressure, motor speed, pump speed, emergency shut off, water temperature, battery temperature, motor temperature, etc.

An accessory kit may also be provided herein for use with the power washing system, 10. The accessory kit may contain an accessory unit, a securing member, an d a combination thereof.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable subcombination.

The invention claimed is:

1. A modular pressure washing system comprising:

a base unit comprising a housing, a pump, a motor, a power source, an input valve, and an output valve, wherein the housing contains the pump and the motor, wherein the housing at least partially contains the power source, wherein the motor is operatively-connected to the power source, wherein the pump is operatively-connected to the motor, wherein the pump is fluidly connected to the input valve, and wherein the pump is fluidly-connected to the output valve; and a frame comprising:

a plurality of wheels including a first wheel and a second wheel, a cut-out area disposed between the first and second wheels, and a support plate disposed adjacent to the cut-out area and configured to support the housing of the base unit, wherein the frame is removably-attachable to the base unit such that the input valve is received in the cut-out area when the base unit is attached to the frame.

2. The modular pressure washing system according to claim 1, comprising a telescoping handle extending from the frame.

3. The modular pressure washing system according to claim 1, wherein the frame comprises one or more receiving slots, wherein the base unit comprises one or more attachment sites projecting from the housing, and wherein the one or more attachment sites of the base unit are each configured to engage with one of the one or more receiving slots of the frame when unit is attached to the frame.

4. The modular pressure washing system according to claim 1, wherein the power source is selected from the group consisting of an internal combustion engine, a DC power source, an AC power source and a combination thereof.

5. The modular pressure washing system according to claim 4, wherein the power source comprises a DC power source.

6. The modular pressure washing system according to claim 5, wherein the DC power source is a battery.

7. The modular pressure washing system according to claim 6, wherein the housing further comprises a top portion and wherein the battery is located within the top portion.

8. The modular pressure washing system according to claim 6, wherein the housing further comprises a battery seal and wherein the battery seal prevents water from accessing the battery.

9. The modular pressure washing system according to claim 4, wherein the power source comprises an AC power source.

10. The modular pressure washing system according to claim 4, wherein the power source comprises an DC power source and an AC power source.

11. The modular power washing system according to claim 1, further comprising a hose engaged with the input valve and extend through the cut-out area of the frame.

12. The modular power washing system according to Claim 11, wherein the frame is configured to be attached to the base unit and removed from the base unit without disengaging the hose from the input valve.

13. The modular pressure washing system according to claim 1, further comprising a handle coupled to the frame, wherein the handle is selected from a telescoping handle and a non-telescoping handle.

14. The modular pressure washing system according to claim 1, wherein the base unit comprises rear feet, and wherein the rear feet are configured to be disposed between the housing of the base unit and the support plate of the frame when the base unit is attached to the frame.

* * * * *